United States Patent
Drakeley et al.

(10) Patent No.: US 7,627,507 B1
(45) Date of Patent: Dec. 1, 2009

(54) PROVIDING ONE PARTY ACCESS TO AN ACCOUNT OF ANOTHER PARTY

(75) Inventors: Erin E. Drakeley, Norwell, MA (US);
Mike Amatucci, Norwell, MA (US);
Lou Iannucci, Hudson, MA (US);
David McLure, Shrewsbury, MA (US);
John McDonough, Braintree, MA (US)

(73) Assignee: FMR LLC, Boston, MA (US)

( * ) Notice: Subject to any disclaimer, the term of this patent is extended or adjusted under 35 U.S.C. 154(b) by 486 days.

(21) Appl. No.: 09/371,687

(22) Filed: Aug. 10, 1999

(51) Int. Cl.
*G06Q 40/00* (2006.01)
(52) U.S. Cl. .................... 705/35; 709/205; 713/183
(58) Field of Classification Search ............. 705/35–45, 705/32, 27, 50–54, 64, 67, 72, 74, 80, 30, 705/33; 713/153, 183; 709/219, 217, 225–229, 709/205; 707/10, 9; 395/188
See application file for complete search history.

(56) References Cited

U.S. PATENT DOCUMENTS

| | | | |
|---|---|---|---|
| 5,649,099 A | | 7/1997 | Theimer et al. |
| 5,696,824 A | * | 12/1997 | Walsh ......................... 705/72 |
| 5,729,734 A | * | 3/1998 | Parker et al. ................... 707/9 |
| 5,796,396 A | * | 8/1998 | Rich ........................... 715/741 |
| 5,802,499 A | * | 9/1998 | Sampson et al. .............. 705/35 |
| 5,875,296 A | | 2/1999 | Shi et al. |
| 5,884,312 A | * | 3/1999 | Dustan et al. ................. 707/10 |
| 5,918,228 A | * | 6/1999 | Rich et al. ..................... 707/10 |
| 5,941,947 A | * | 8/1999 | Brown et al. ................. 709/225 |
| 5,970,477 A | * | 10/1999 | Roden ..................... 379/112.01 |
| 5,974,135 A | * | 10/1999 | Breneman et al. ...... 379/265.04 |
| 5,991,878 A | * | 11/1999 | McDonough et al. ....... 713/200 |
| 6,006,333 A | * | 12/1999 | Nielsen ........................... 726/8 |
| 6,038,597 A | * | 3/2000 | Van Wyngarden .......... 345/741 |
| 6,047,268 A | * | 4/2000 | Bartoli et al. ................. 705/35 |
| 6,128,602 A | * | 10/2000 | Northington et al. .......... 705/35 |
| 6,230,171 B1 | * | 5/2001 | Pacifici et al. ............... 715/512 |

(Continued)

FOREIGN PATENT DOCUMENTS

EP        0456920 A2    11/1991

OTHER PUBLICATIONS

Sikorski, Robert. "A Privacy Prmer for the Web." JAMA. Apr. 15, 1998, vol. 279, No. 15, pp. 1219-1220.*

(Continued)

*Primary Examiner*—Kambiz Abdi
*Assistant Examiner*—Elda Milef
(74) *Attorney, Agent, or Firm*—Fish & Richardson P.C.

(57) ABSTRACT

A first party is provided with access to an account of a second party by inputting identification information for the account of the second party, and receiving account information for the account of the second party based on the identification information. The account of the second party is accessed based on the account information.

27 Claims, 8 Drawing Sheets

U.S. PATENT DOCUMENTS

| | | | |
|---|---|---|---|
| 6,240,444 B1 * | 5/2001 | Fin et al. | 709/205 |
| 6,256,739 B1 * | 7/2001 | Skopp et al. | 713/201 |
| 6,295,551 B1 * | 9/2001 | Roberts et al. | 709/205 |
| 6,327,573 B1 * | 12/2001 | Walker et al. | 705/14 |
| 6,397,337 B1 * | 5/2002 | Garrett et al. | 713/202 |
| 6,470,453 B1 * | 10/2002 | Vilhuber | 713/201 |
| 6,587,880 B1 * | 7/2003 | Saigo et al. | 709/225 |
| 6,687,739 B2 * | 2/2004 | Anupam et al. | 709/204 |
| 6,754,693 B1 * | 6/2004 | Roberts et al. | 709/205 |
| 7,058,817 B1 * | 6/2006 | Ellmore | 713/183 |
| 2001/0014878 A1 * | 8/2001 | Mitra et al. | |
| 2001/0049630 A1 * | 12/2001 | Justice | 705/26 |
| 2002/0069174 A1 * | 6/2002 | Fox et al. | 705/52 |
| 2003/0216990 A1 * | 11/2003 | Star | 705/35 |
| 2004/0062370 A1 * | 4/2004 | O'Neal et al. | 379/112.01 |

OTHER PUBLICATIONS

Trowbridge, Dave. "VARs Find Profit in Crime." Computer Technology Review. Los Angeles: Jul 1992. vol. 12, Iss. 8; p. 1, 3 pgs.*

O'Harrow, Robert Jr., "Banks Told to Boost Data Safeguards; Regulators Call Procedures on Customer Information Inadequate to Curb Internet Abuses", The Washington Post. Washington D.C.: Aug. 21, 1998, p. G. 01 (3 pages).*

"Special Edition, Using Microsoft Windows 95". Que Corporation. 1997. pp. 234-235, (5 pages).*

* cited by examiner

PROVIDING ONE PARTY ACCESS TO AN ACCOUNT OF ANOTHER PARTY

BACKGROUND OF THE INVENTION

This invention relates to providing one party with access to an account of another party.

Investment firms provide their customers (including plan sponsors and participants) with on-line access to accounts, such as retirement accounts and investment accounts. To access an account via the Internet, for example, the owner or manager of the account enters a user identifier ("ID") and a password on a Web page provided by the investment firm. Once inside the account, the owner or manager can view account information, such as balances, or change account parameters, such as fund allocations.

SUMMARY OF THE INVENTION

In general, in one aspect of the invention, an account of a second party is accessed by inputting identification information for the account (such as a user ID), and receiving account information for the account based on the identification information. The account is accessed based on this account information.

Among the advantages of the invention may be one or more of the following. The first party can access the account without knowing the second party's password. This is particularly advantageous if the first party is an employee of an investment firm that maintains the account. For example, the employee is able to view the same information as the account owner, thus making it easier for the employee to address any problems that the account owner is having with the account or with accessing information in the account. Another benefit is that changes to the account can be made by the employee, if the owner so desires.

The foregoing aspect may include one or more of the following features/functions. The account information may define a right of a first party to access computer programs associated with the account. The account information may be stored in a text file. The first party may access the account information by requesting access to the account, receiving an interrogation into the text file from software that controls access to the account, and receiving access to the account if the software determines, based on the interrogation, that the first party is entitled to access the account. The first party may input the identification information on a Web page accessed by a Web browser. The text file may comprise an Internet cookie.

The above aspect may also include the first party inputting identifying information, and receiving access information that corresponds to the identifying information. The access information may define a right of the first party to access a program which includes the account of the second party. The program may be accessed based on the access information. The inputting, receiving, and accessing noted above may be performed from the program. Access to the program by the first party may be governed by the access information. Information from the account may be displayed. A parameter of the account may be changed.

In general, in another aspect, to access an account of a second party, a first party receives identification information for the account. It is then verified that the first party is entitled to access the account based on the identification information. Account information is provided to the first party for use in accessing the account.

This aspect may include one or more of the following features/functions. It may include receiving a request from the first party to access the account of the second party, obtaining account information from the first party, and determining whether the first party is entitled to access the account based on the account information. The aspect may include receiving information identifying the first party, verifying that the first party is entitled to access a program that includes the account of the second party based on the identification information, and providing, to the first party, access information for use in accessing the program. The aspect may include receiving a request from the first party to access the program that includes the account of the second party, obtaining the access information from the first party, and determining whether the first party is entitled to access the program based on the access information.

Other features and advantages will become apparent from the following description, claims and drawings.

DESCRIPTION

In some embodiments, one party (the "pretender") can access an account of another party without knowing the other party's password. For example, an employee of an investment firm can access a retirement or investment plan of a company, an individual account in such a plan, or an independent account of a private investor. Once the account is accessed, the information that would be displayed to its owner or manager is displayed to the pretender. "Owner" refers to the person that owns funds in an account, and "manager" refers to the person that makes investment decisions for the account, but does not necessarily own the funds in the account (though he may).

Figure 1:
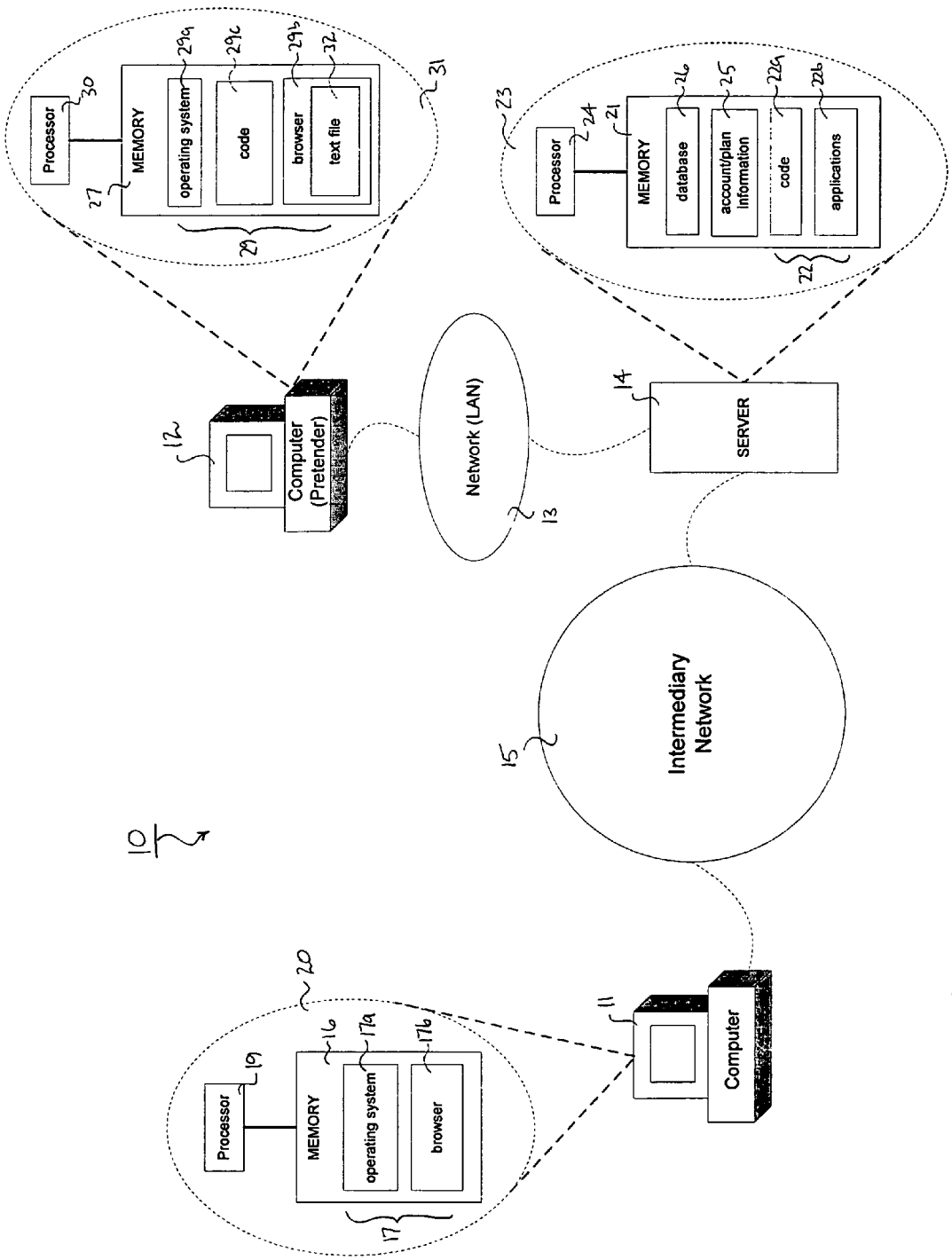
FIG. 1 is a plan view of a network system that includes a server and a remote computer on which a first party accesses the account of second party.

A network system 10 for implementing this embodiment is shown in FIG. 1. Network system 10 includes computers 11 and 12, network 13, server 14, and intermediary network 15.

Intermediary network 15 may be the Internet, a wide area network ("WAN"), or any other IP (Internet Protocol) or non-IP network capable of transmitting HTML (HyperText Markup Language) (or "Web") pages. Connected to network 15 are server 14 and computer 11. Computer 11 is a personal computer ("PC"), or other processing device, which includes a memory 16 for storing computer programs 17 and a processor 19 for executing those programs to perform various functions (see view 20). Among the programs stored in memory 16 are an operating system ("OS") 17a, such as Microsoft® Windows98®, and a Web browser 17b, such as Netscape® Navigator®, for accessing from server 14.

Server 14 is a World Wide Web ("WWW") server that can be implemented on one or more computers (only one computer is shown). Server 14 includes a memory 21 which stores computer programs 22 and a processor 24 which executes instructions in those computer programs to perform various functions (see view 23). The computer programs stored in memory 21 include code 22a and applications 22b.

Applications 22b enable remote users at computers 11 and 12 to access information 25 on accounts that are accessible to server 14. Commercial embodiments of such applications include Plan Sponsor Webstation® ("PSW") and NetBenefits®, both from Fidelity® Investments. PSW provides a plan sponsor, such as an employer, with information about an investment plan. For example, using PSW, an employer can obtain information about its employees' retirement plan. NetBenefits® provides an individual with information about investment accounts and other financial services available to the individual. The term "account" will be used to denote any type of investment account, such as an individual investment account or a company investment plan.

Code 22a receives identification information from a pretender, and authenticates the pretender based on information in database 26. Database 26 includes user IDs, passwords, and other information for permitting a pretender to access the accounts of another party. Once the pretender is authenticated, code 22a retrieves information from database 26 and provides that information to the pretender. This information identifies which of applications 22b are accessible to the pretender, and which computer programs within each of those applications are accessible to the pretender. A detailed description of these functions of code 22a is provided below. Commercial embodiments of code 22a include the Pretender and Profiler software from Fidelity® Investments.

Server 14 is connected to network 13. Network 13 is a local area network ("LAN") that supports an intranet running HTTP (Hyper Text Transport Protocol), over which Web pages are transmitted from server 14 to a pretender logged onto computer 12. Computer 12 is a PC, or the like, which includes a memory 27 for storing computer programs 29 and a processor 30 for executing instructions in those programs to perform various functions (see view 31).

Stored in memory 27 are OS 29a, such as Microsoft® Windows98®, and a Web browser 29b, such as Netscape® Navigator®. Web browser 29b is used to access Web pages generated by code 22a in server 14. Web browser 29b includes a text file 32 (such as an Internet "cookie") which contains information relating to a pretender on computer 12.

Text file 32 contains the following fields: LB$T, LB$A, LB$I, LB$R, LB$D, SP$T, and SP$I. LB$T is a ticket associated with a pretender "session" and is used to track the activities of a pretender during that session. LB$A identifies programs in an application (see LB$D) that the pretender is allowed to access. LB$I is the user ID of the pretender. LB$R indicates a realm in which the pretender is operating. For example, LB$R may indicate that the pretender is viewing the contents of another party's account or that the pretender is performing tests on applications. LB$D indicates which applications a pretender is allowed to access. SP$T is used by code 29c to exit a session after a predetermined time of inactivity. SP$I is the user ID of the account owner or the pretender.

Figure 2:
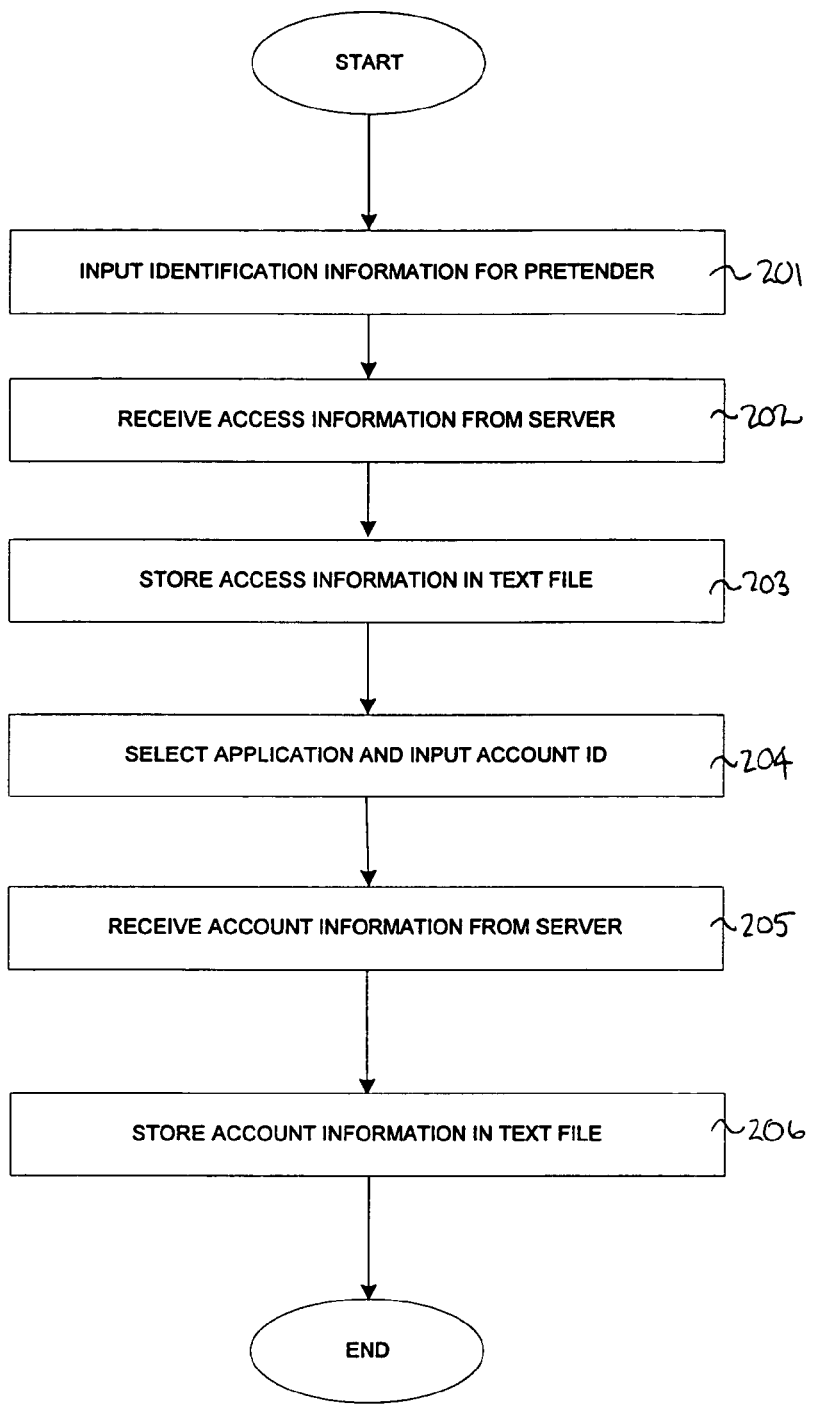
FIG. 2 is a flowchart showing a process, performed on the remote computer, for accessing the account.
Figure 3:
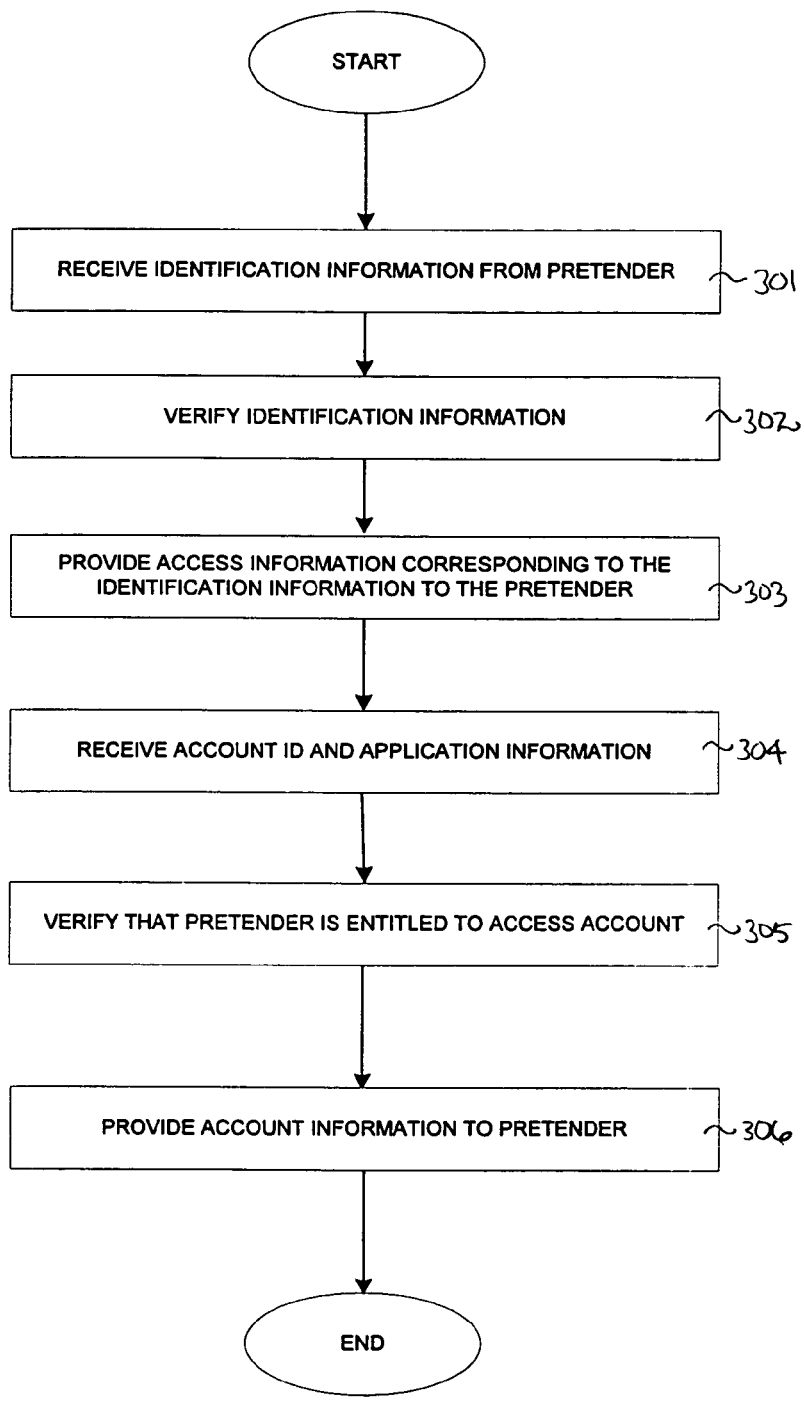
FIG. 3 is a flowchart showing a process, performed on the server, for accessing the account.
Figure 4:
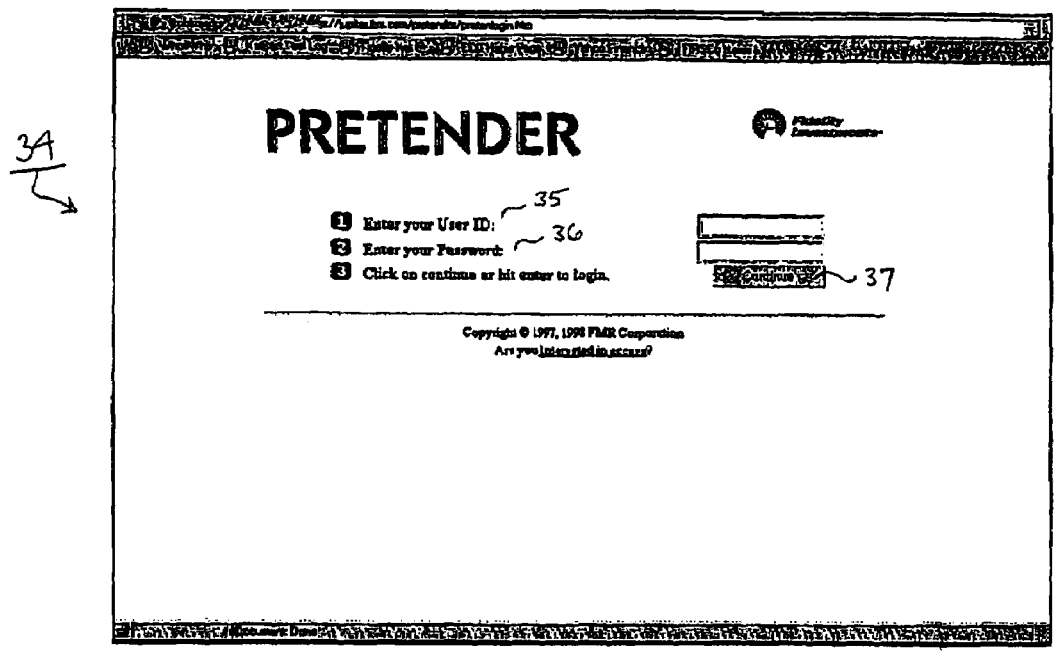
FIG. 4 is a view of a login Web page presented to the first party on the remote computer.

Code 29c, which is also stored in memory 27, interacts with browser 29b and code 22a in server 14 to enable a pretender at computer 12 to access others' accounts. In FIGS. 2 and 3, a pretender at computer 12 inputs (201) identification information via a Web page 34 (FIG. 4) provided by server 14. The identification information includes the user ID 35 and password 36 assigned to the pretender. Clicking on "Continue" button 37 causes code 29c to transmit the identification information to server 14.

At server 14, code 22a receives (301) the identification information of the pretender from computer 12. Code 22a verifies (302) the password and user ID of the pretender by comparing them to passwords and user IDs stored in database 26. If code 22a determines that the pretender's user ID and password match those stored in database 26, code 22a locates access information in database 26 corresponding to the user ID and password of the pretender. The access information is stored in association with the user ID and password, and specifies which of applications 22b the pretender may access.

Code 22a retrieves the access information for the pretender and provides (303) it to computer 12. Code 22a also outputs a Web page 39 (FIG. 5) to computer 12. Web page 39 includes selection buttons 40 for selecting which of applications 22b to access, and pull-down bar 41 which can also be used to select an application 22b. Web page 39 also includes entry box 42 for entering a user ID to access a user's account. This user ID may be the social security number of the account owner, the actual user ID of the account owner, or any other account identifier.

Returning to FIG. 2, code 29c in computer 12 receives (202) the access information from server 14, and stores (203) the access information in text file 32, in particular, in the LB$D field. Web page 39 (FIG. 5) is also displayed on computer 12. Using this Web page, the pretender selects (204) an application 22b and inputs a user ID in entry box 42 that corresponds to an account the pretender wants to access from the selected application. This information is transmitted to server 14, where it is received (304) by code 22a.

Code 22a verifies (305) that the pretender is entitled to access the account based on the identification information for the pretender and the user ID from Web page 39. In particular, code 22a searches through database 26 to determine if the pretender has the right to access the account associated with the input user ID. If information in database 26 indicates that the pretender is permitted to access the account, code 22a retrieves information from database 26 that specifies the scope and content of the pretender's right of access to the account.

An account may provide access to one or more computer programs and/or databases. For example, a user's investment account may be served by programs for transmitting money between funds and determining fund performance, as described below. Database 26 contains information specifying which programs (and/or databases) a pretender may access in each account and/or restrictions on the pretender's rights of access. Code 22a provides (306) this information (called "account information") to computer 12.

Code 29c in computer 12 receives (205) the account information from server 14, and stores (206) the account information in text file 32, in particular, in the LB$A field. The access information and account information in text file 32 are used in gaining access to accounts and applications. For example, if a pretender selects applications 44 or 45 from Web page 39

(FIG. 5), and inputs an account number in entry box 42, code 22a provides Web page 46 (FIG. 6) to computer 12. Web page 46 includes the same information that is displayed to the user specified in entry box 42 when the user accesses the account. Web page 46 also includes an indication 47 that the pretender is "pretending" to be the user whose ID is specified in entry box 42, and identification information 49 for the user.

The rights of the pretender to view data, execute programs, and change parameters of the account of Web page 46 are specified in the account information (LB$A) in text file 32. For example, Web page 46 displays icons 50 for executing programs that are available in the account. These icons include "Balances" icon 50a for executing a program to obtain account balances; "Quotes" icon 50b for executing a program to obtain stock quotes and the like; "Market Indices" icon 50c for executing a program to obtain market indices; "Fund Performance" icon 50d for executing a program to determine the performance of funds in the account; "Fund Exchanges" icon 50e for executing a program to move money between funds; "Contribution Elections" icon 50f for executing a program to contribute money to funds; "Payroll Deductions" icon 50g for executing a program to specify payroll deductions; "Loans" icon 50h for executing a program to inquire about loans; "Withdrawal" icon 50i for executing a program to withdraw money from the account; "Transaction History" icon 50j for executing a program to obtain a transaction history for the account; "Plan Literature" icon 50k for executing a program to obtain literature about an investment plan; "Plan Information" icon 50l for executing a program to obtain information about an investment plan; and "Calculator" icon 50m for executing a calculator program.

Figure 7:
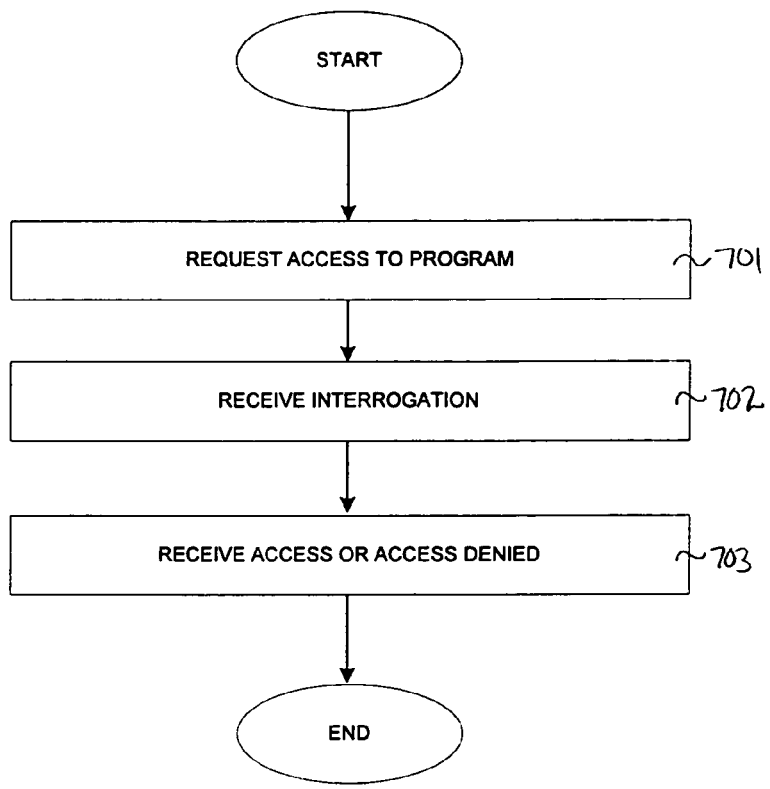
FIG. 7 is a flowchart showing a process, performed on the remote computer, for accessing a program in the account.
Figure 8:
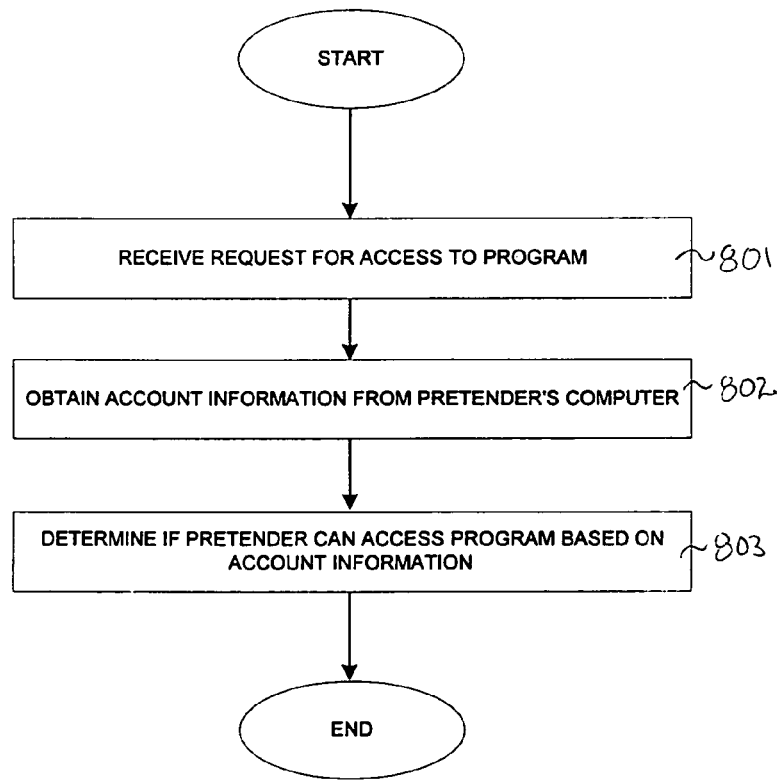
FIG. 8 is a flowchart showing a process, performed on the server, for accessing a program in the account.

Which of the programs the pretender has a right to access is specified in the account information in the LB$A field of text file 32. Upon execution, code (not shown) in a program interrogates text file 32 to determine if the pretender can access the program. Referring to FIGS. 7 and 8, the pretender requests (701) access to a program by clicking on one of icons 50. Code 22a in server 14 receives (801) the request and obtains (802) account information from text file 32 in browser 29b. Specifically, code 22a interrogates the LB$A field of the text file. Code 22a receives (702) the interrogation request and allows the text file to be probed. Code 22a then determines (803) if the pretender is permitted to access the program based on the account information in the LB$A field.

If the pretender is permitted to access the program, the pretender receives access in 703; otherwise access is denied. The account information in LB$A may permit the pretender to execute programs for viewing/accessing information relating to an account (e.g., fund performance), but not to change parameters of the account (e.g., to move money from one fund to another). Alternatively, the access information may permit the pretender to change account parameters. Access to the account may be provided to a pretender from an application 22b regardless of whether the owner of the account can access that application.

Figure 5:
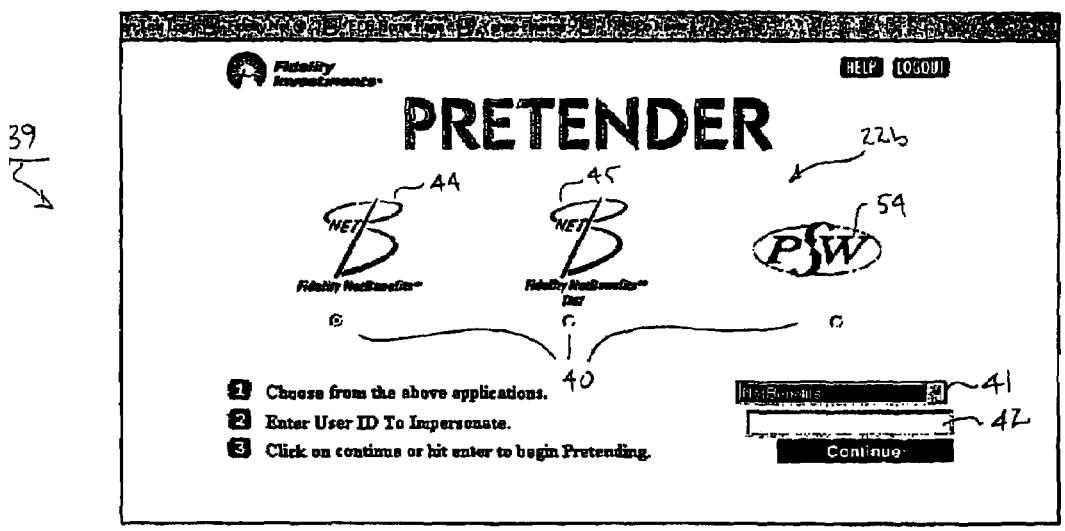
FIG. 5 is a view of a Web page presented to the first party for selecting an account and applications for accessing the selected account.
Figure 6:
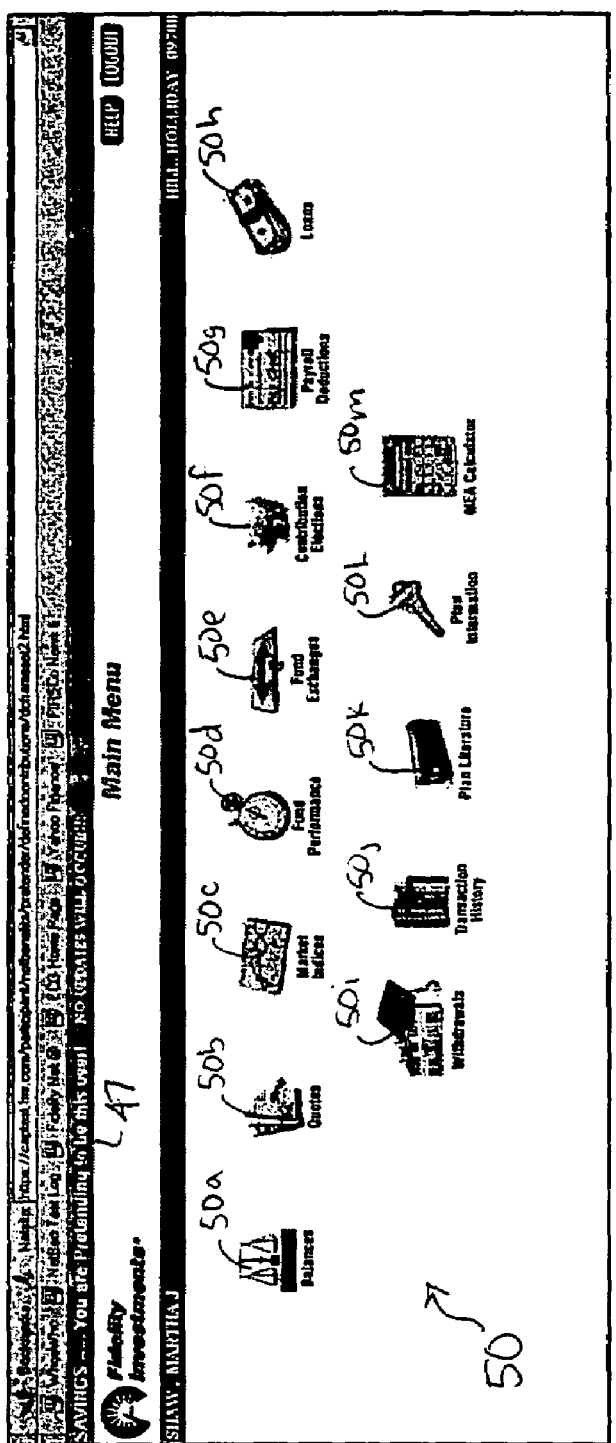
FIG. 6 is a view of a Web page presented to the first party showing programs available from within the selected account.
Figure 9:
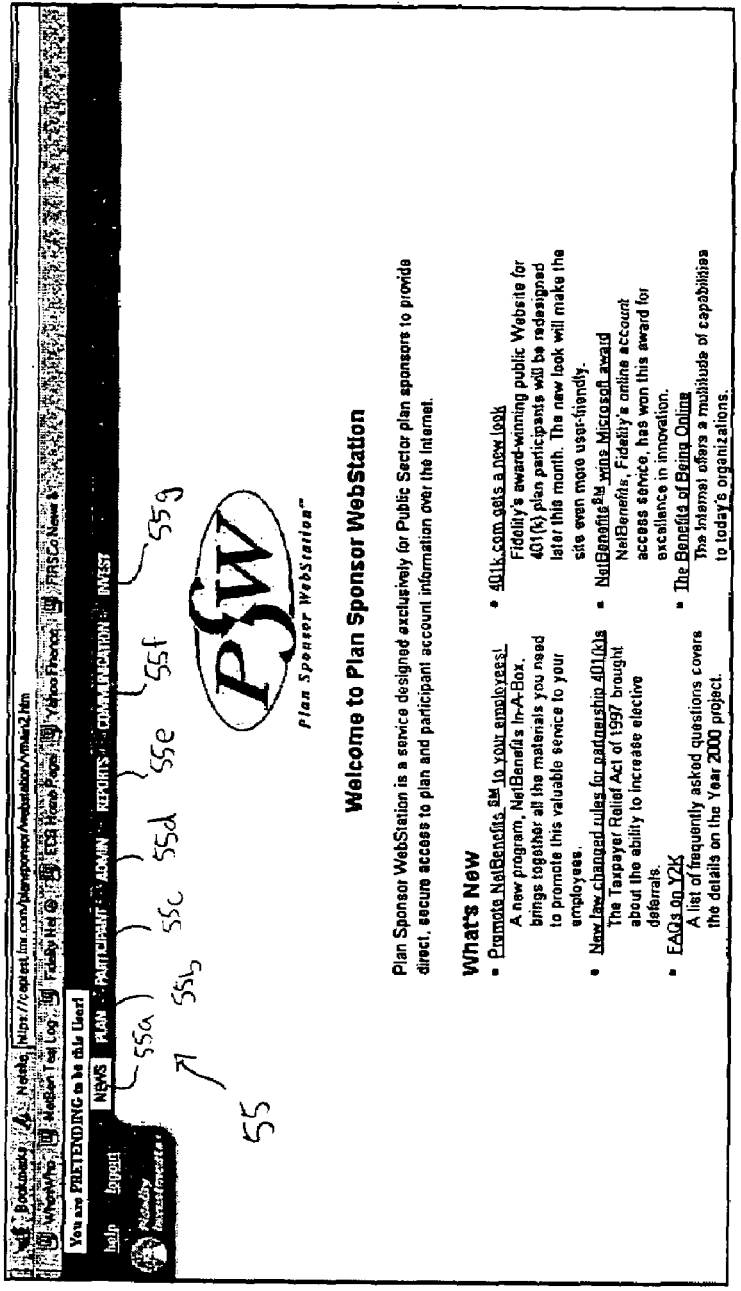
FIG. 9 is a view of an alternate Web page presented to the first party showing programs available from within a selected account.

FIG. 9 shows a Web page 52 that is accessed via application 54 (FIG. 5). As in Web page 46 of FIG. 6, web page 52 includes various programs that can be accessed therefrom. These programs 55 include "News" 55a (shown) for executing a program to obtain news about an account (plan), "Plan" 55b for executing a program to access information on a specific plan (see below); "Participant" 55c for executing a program to obtain information on a plan participant; "Admin" 55d for executing a program to obtain information regarding plan administration; "Reports" 55e for executing a program to obtain plan reports; "Communication" 55f for executing a program relating to communication; and "Invest" 55g for executing a program to invest in a plan.

As above, which of the foregoing programs the pretender has a right to access is specified in account information in the LB$A field of text file 32. Upon execution, code in a program interrogates the text file to determine if the pretender can access the program. This is done in accordance with the processes of FIGS. 7 and 8. Also, as above, the view and information provided by Web page 52 is the same view and information that the plan sponsor specified in entry box 42 (FIG. 5) would see.

Figure 10:
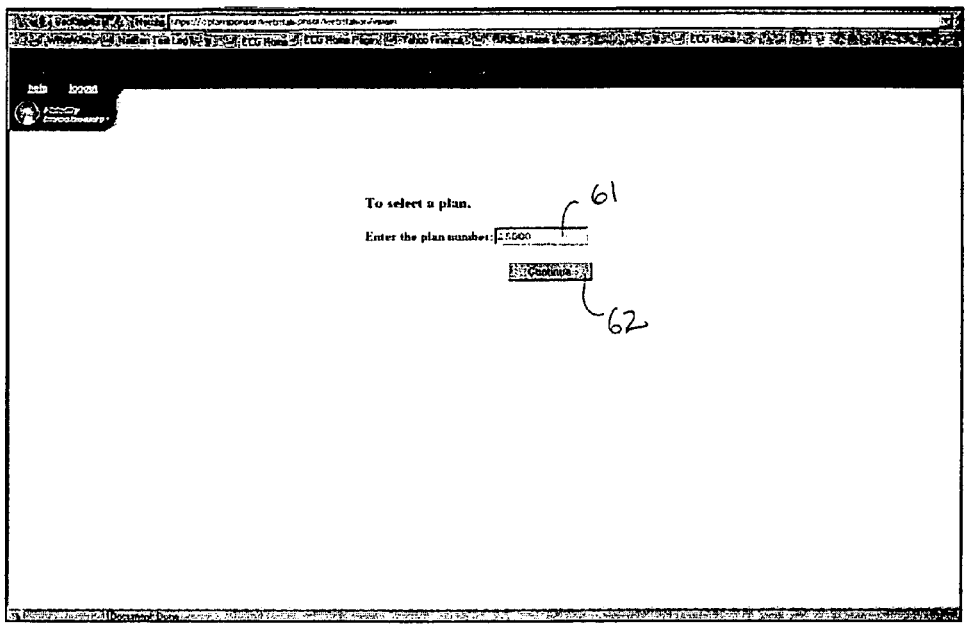
FIG. 10 is a view of Web page for accessing an account (plan) from the Web page of FIG. 9.
Figure 11:
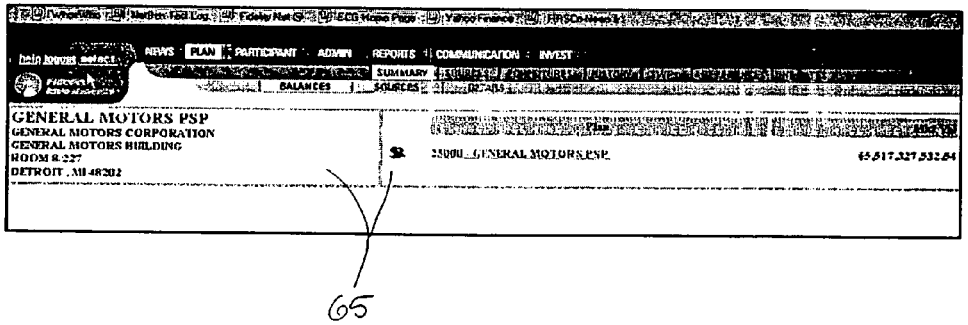
FIG. 11 is a view of a Web page which displays information for an account input in the Web page of FIG. 10.

As an alternative to the view of the plan sponsor provided in FIG. 9, the pretender can obtain information about a specific plan (such as content, templates, and the like) that is not associated with a particular plan sponsor's view. Clicking on "Plan" 55a (FIG. 9) produces Web page 60 shown in FIG. 10. From Web page 60, the pretender is prompted to enter a plan number in entry box 61. Clicking on "Continue" button 62 retrieves Web page 64 (FIG. 11), which includes information 65 on the plan number entered in entry box 61. As above, the pretender will be able to do this if it is permitted by the account information in text file 32.

Returning to FIG. 5, each time a pretender enters a new application 22b in a current pretender session, code in that application interrogates the access information (LB$D) in the text file 32 to determine if the pretender has the right to enter that application. Once in the application, accessing programs in the application is performed in accordance with FIGS. 7 and 8 above.

Other embodiments are also within the scope of the following claims. For example, programs 50 in an application 44 might themselves include embedded programs. Rights of access to such embedded programs may also be specified in a text file that is interrogated by such embedded programs prior to their execution. The pretender can obtain access to accounts while the owner is accessing the account (at the same time) or while the owner is not accessing the account.

What is claimed is:

1. A method for displaying, to a pretender, a view and information that is also displayed to a particular party, the method comprising:
   receiving, through a first web page generated by first code, pretender identification information associated with a pretender;
   using the pretender identification information to identify a set of applications available to the pretender;
   receiving, through a second web page generated by the first code, information selecting an application from the set of applications, and an account identifier representative of an account of the particular party;
   on the basis of the pretender identification information and the account identifier, verifying that the pretender is authorized to access the account; and
   causing the first code to generate a third web page that displays, to the pretender, a view and information that is the same as a view and information of a web page that would be displayed to the particular party were the particular party to access the account through a selected application, the selected application being identified by the information selecting an application from the set of applications;
   wherein a first browser displays the view and information to the pretender, and
   wherein a second browser, which differs from the first browser, would display the view and information to the particular party.

2. The method of claim 1, further comprising:
in response to receiving the pretender identification information,
authenticating the pretender; and
starting a session in which the pretender interacts with the first code.

3. The method of claim 1, further comprising:
retrieving access information that identifies applications that are available, through the first code, for use by the authenticated pretender; and
providing to a computing system associated with the pretender, the retrieved access information for storage in an access information field of a text file associated with a session of the pretender.

4. The method of claim 1, further comprising:
retrieving account information that identifies programs associated with the selected application, the programs being available for use by the pretender through a selected application to access account data associated with the account of the particular party; and
providing, to a computing system associated with the pretender, the retrieved account information for storage in an account-information field of a text file associated with the session.

5. The method of claim 4, wherein the retrieved account information specifies a right selected from the group consisting of: a right of the pretender to execute a program from within a selected application; a right of the pretender to change a parameter of an account of the particular party; and a right of the pretender to access a database.

6. The method of claim 1, wherein the third web page displays an icon representative of a program that is executable from within the selected application to provide the pretender with access to account data associated with the account of the particular party.

7. The method of claim 1, wherein the third web page displays information indicating that the pretender is impersonating the particular party.

8. The method of claim 1, wherein the pretender identification information comprises a user identifier and an authenticator.

9. The method of claim 1, wherein the set of applications comprises an application selected from the group consisting of:
an application for accessing a retirement account, and
an application for accessing an investment account.

10. A computer-program product, stored on a computer-readable medium, the computer-program product comprising software for displaying, to a pretender, a view and information that is also displayed to a particular party, the software comprising instructions that cause a processor to:
receive, through a first web page generated by first code, pretender identification information associated with a pretender;
use the pretender identification information to identify a set of applications available to the pretender;
receive, through a second web page generated by the first code, information selecting an application from the set of applications, and an account identifier representative of an account of the particular party;
on the basis of the pretender identification information and the account identifier, verify that the pretender is authorized to access the account; and
cause the first code to generate a third web page that displays, to the pretender, a view and information that is the same as a view and information of a web page that would be displayed to the particular party were the particular party to access the account through a selected application, the selected application being identified by the information selecting an application from the set of applications,
wherein a first browser displays the view and information to the pretender, and
wherein a second browser, which differs from the first browser, would display the view and information to the particular party.

11. The computer-program product of claim 10, wherein the computer-program product further comprises instructions that cause the processor to:
in response to receipt of the pretender identification information,
authenticate the pretender; and
start a session in which the pretender interacts with the first code.

12. The computer-program product of claim 11, further comprising instructions that cause the processor to:
retrieve access information that identifies the remote user applications that are available for use by the authenticated pretender through the first code; and
provide, to a computing system associated with the pretender, the retrieved access information for storage in an access-information field of a text file associated with the session.

13. The computer-program product of claim 10, further comprising instructions that cause the processor to:
retrieve account information that identifies programs associated with the selected application, the programs being available for use by the pretender through a selected application to access account data associated with the account of the particular party; and
provide, to a computing system associated with the pretender, the retrieved account information for storage in an account-information field of a text file associated with a session of the pretender.

14. The computer-program product of claim 13, wherein the retrieved account information specifies a right selected from the group consisting of: a right of the pretender to execute a program from within a selected application; a right of the pretender to change a parameter of an account of the particular party; and a right of the pretender to access a database.

15. The computer-program product of claim 10, wherein the instructions to cause the processor to generate a third web page comprise instructions to cause the processor to:
generate a third web page that, when rendered by a web browser, displays an icon representative of a program that is executable from within the selected application to provide the pretender with access to account data associated with the account of the particular party.

16. The computer-program product of claim 10, wherein the instructions to cause the processor to generate a third web page comprise instructions to cause the processor to:
generate a third web page that, when rendered by a web browser, displays information indicating that the pretender is impersonating the particular party.

17. The computer-program product of claim 10, wherein the instructions for receiving pretender identification information comprise instructions to receive a user identifier and an authenticator.

18. The computer-program product of claim 10, wherein the instructions that cause a processor to identify a set of applications comprise instructions for selecting an application from the group consisting of: an application for accessing a retirement account, and an application for accessing an investment account.

19. An apparatus for displaying, to a pretender, a view and information that is also displayed to a particular party, the apparatus comprising:
   a processor; and
   a memory comprising instructions that cause the processor to:
   receive, through a first web page generated by first code, pretender identification information associated with a pretender;
   use the pretender identification information to identify a set of applications available to the pretenders
   receive, through a second web page generated by the first code, information selecting an application from the set of applications, and an account identifier representative of an account of the particular party;
   on the basis of the pretender identification information and the account identifier, verify that the pretender is authorized to access the account; and
   cause the first code to generate a third web page that displays, to the pretender, a view and information that is the same as a view and information of a web page that would be displayed to the particular party were the particular party to access the account through a selected application, the selected application being identified by the information selecting an application from the set of applications,
   wherein a first browser displays the view and information to the pretender, and
   wherein a second browser would display the view and information to the particular party,
   the second browser being different from the first browser.

20. The apparatus of claim 19, wherein the memory further comprises instructions that cause the processor to:
   authenticate the pretender; and
   start a session in which the pretender interacts with the first code.

21. The apparatus of claim 20, wherein the memory further comprises instructions that cause the processor to:
   retrieve access information that identifies the applications that are available, through the first code, for use by the authenticated pretender; and
   provide, to a computing system associated with the pretender, the retrieved access information for storage in an access-information field of a text file associated with the session.

22. The apparatus of claim 19, wherein the memory further comprises instructions that cause the processor to:
   retrieve account information that identifies programs associated with the selected application, the programs being available for use by the pretender through the selected application to access account data associated with the account of the particular party; and
   provide, to a computing system associated with the pretender, the retrieved account information for storage in an account-information field of a text file associated with a session of the pretender.

23. The apparatus of claim 22, wherein the retrieved account information specifies a right selected from the group consisting of: a right of the pretender to execute a program from within the selected application; a right of the pretender to change a parameter of the second account; and a right of the pretender to access a database.

24. The apparatus of claim 19, wherein the memory comprises instructions to cause the processor to:
   generate a third web page that, when rendered by a web browser, displays an icon representative of a program that is executable from within the selected application to provide the pretender with access to account data associated with the account of the particular party.

25. The apparatus of claim 19, wherein the memory comprises instructions to cause the processor to:
   generate a third web page that, when rendered by a web browser, displays information indicating that the pretender is impersonating the particular party.

26. The apparatus of claim 19, wherein the pretender identification information comprises a user identifier and an authenticator.

27. The apparatus of claim 19, wherein the set of applications comprises an application selected from the group consisting of: a remote user application for use in accessing a retirement account, and a remote user application for use in accessing an investment account.

* * * * *

UNITED STATES PATENT AND TRADEMARK OFFICE
CERTIFICATE OF CORRECTION

| | | |
|---|---|---|
| PATENT NO. | : 7,627,507 B1 | Page 1 of 1 |
| APPLICATION NO. | : 09/371687 | |
| DATED | : December 1, 2009 | |
| INVENTOR(S) | : Erin E. Drakeley et al. | |

It is certified that error appears in the above-identified patent and that said Letters Patent is hereby corrected as shown below:

Column 9, line 14, in Claim 19, delete "pretenders" and insert --pretender;--, therefore.

Signed and Sealed this

Nineteenth Day of January, 2010

David J. Kappos
*Director of the United States Patent and Trademark Office*